United States Patent [19]

Yamaoka et al.

[11] Patent Number: 5,214,759
[45] Date of Patent: May 25, 1993

[54] MULTIPROCESSORS INCLUDING MEANS FOR COMMUNICATING WITH EACH OTHER THROUGH SHARED MEMORY

[75] Inventors: Akira Yamaoka, Hadano; Kenichi Wada, Sagamihara, both of Japan

[73] Assignee: Hitachi, Ltd., Tokyo, Japan

[21] Appl. No.: 526,718

[22] Filed: May 22, 1990

[30] Foreign Application Priority Data

May 26, 1989 [JP] Japan ................................. 1-131343

[51] Int. Cl.$^5$ ........................................... G06F 13/00
[52] U.S. Cl. .................................... 395/200; 395/425
[58] Field of Search ................. 364/DIG. 1, DIG. 2; 395/200, 425, 250

[56] References Cited

U.S. PATENT DOCUMENTS 4,325,116 4/1982 Kranz et al. ........................ 395/425

Primary Examiner—Robert L. Richardson
Attorney, Agent, or Firm—Antonelli, Terry Stout & Kraus

[57] ABSTRACT

In a memory device shared among processors, a communication buffer having a size requested by the processing program of the origin of sending is dynamically secured. After the communication buffer has been secured, the send program writes a message to be conveyed to the receive program into the above described communication buffer and asks the send OS to perform sending. The send OS sends a communication ID having "1" set in the bit position corresponding to the receive program. On the basis of the above described bit position, the receive OS specifies a receive program and informs the receive program of that fact. The receive program reads a message from the communication buffer. Communication between the send program and the receive program is thus realized. A send instruction and a receive instruction respectively for exclusive use of sending and reading out a communication ID are prepared beforehand.

50 Claims, 9 Drawing Sheets

F I G. 8
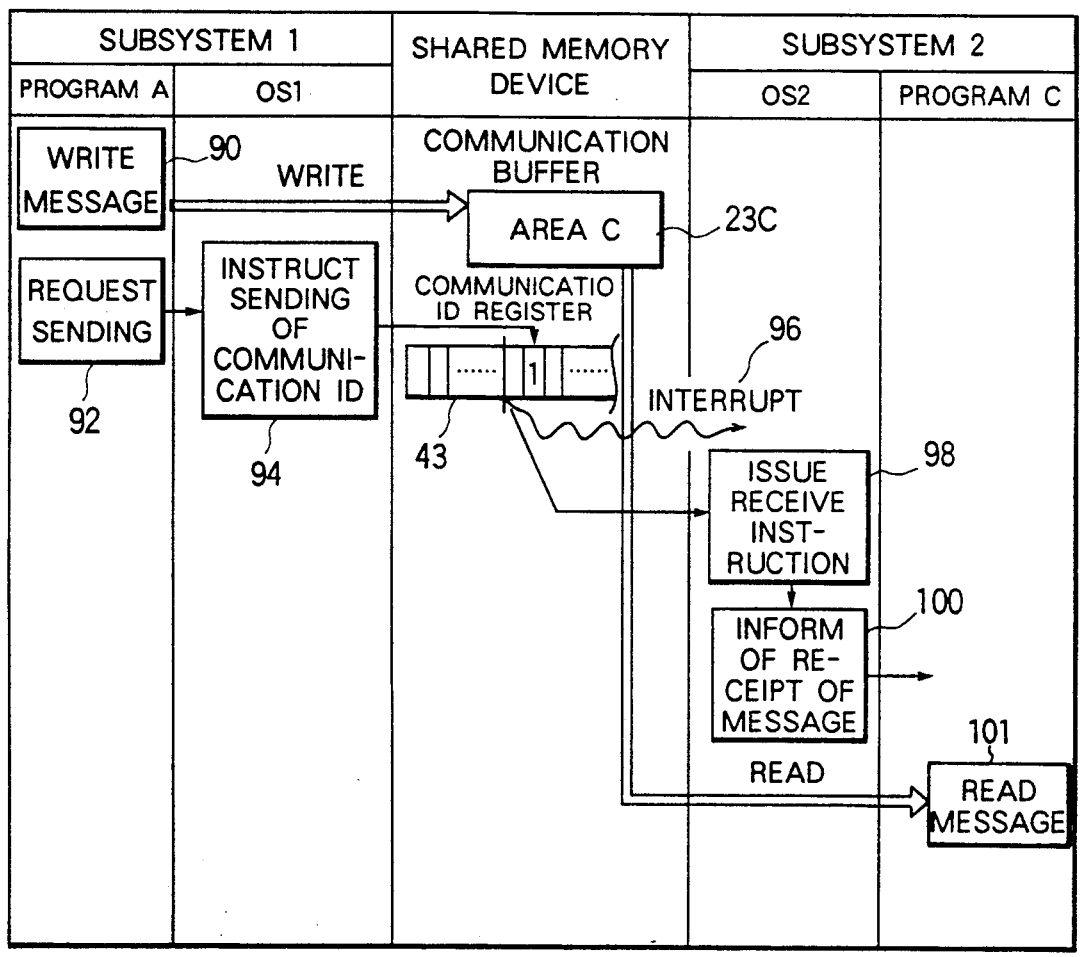

MULTIPROCESSORS INCLUDING MEANS FOR COMMUNICATING WITH EACH OTHER THROUGH SHARED MEMORY

BACKGROUND OF THE INVENTION

The present invention relates to a multiprocessor system and an interprocessor communication scheme suitable for reducing CPU overheads of interprocessor communication.

In one scheme for communication between a plurality of subsystems each comprising a main memory and an instruction processing device, such communication is performed by using a channel coupling device in the same way as communication between the input and output as described in JP-A-60-84658. When this scheme is used, the overhead of a processor required for communication becomes large. In another scheme such as that described hereafter, therefore, a shared memory device, which is accessible by a processor instruction, is provided separately from a main memory, and the shared memory device is shared among a plurality of subsystems and used as a communication buffer.

In a scheme described in JP-A-58-56063, a shared memory device for communication is provided in a system supervisory device and divided into communication buffers associated with respective subsystems. As for the send operation, an operating system (hereafter abbreviated to OS) requested by a program of the send side writes communication data into a communication buffer so provided in the shared memory device as to be associated with a subsystem of the other party. The communication data includes a communication message (hereafter referred to simply as a message) to be conveyed from a send program to a receive program and discriminating information between the program of the send side and the program of the receive side. The system supervisory device generates an interrupt with respect to the subsystem of the other party. As for the receive operation, the OS within the subsystem of the other party which has received the interrupt reads the communication data out of the communication buffer, decodes the discriminating information and conveys the message to the program of the receive side.

In a scheme described in JP-A-60-237566, a part of the shared memory device is divided into communication buffers respectively associated with subsystems and those communication buffers are provided beforehand with respective addresses. As for the send operation, the OS requested by a program of the send side writes communication data (such as the message and the discriminating information) into a communication buffer so provided in the shared memory device as to be associated with the subsystem of the other party and makes another means generate an interrupt with respect to the subsystem of the other party. As for the receive operation, the OS included in the subsystem of the other party which has received an interrupt reads communication data out of a communication buffer associated with its own subsystem and conveys a message included in the communication data to a program of the receive side specified by discriminating information contained in the communication data thus read out. Further, the OS of the receive side writes a specific pattern into a subsystem thereof to inform a subsystem of the send side that the communication data has been received.

The above described prior art has problems hereafter described.

(1) In the subsystem, a plurality of programs collected by the OS are activated. Discriminating information for specifying the send program and the receive program and a message to be transferred between those programs are mixedly contained in the communication data. Therefore, the OS of the subsystem of the receive side must read once the communication data out of the shared memory device into the main memory device included in that subsystem, decode the discriminating information, and inform the program of the receive side controlled by that OS of the discriminating information thus decoded. Since the communication buffer included in the shared memory device must be released early for the next communication, however, the OS must transfer the message portion of the communication data to the main memory device. That is to say, the OS of the receive side must read the communication data stored in the shared memory device into an area included in the main memory device and allocated to the OS and then transfer the communication data thus read out to an area of the main memory device specified by discriminating information contained in that communication data and allocated to the receive program. A transfer comprising two stages thus becomes necessary, resulting in an increased CPU overhead of communication processing.

(2) The communication buffer which is a part of the shared memory device has a fixed size. In case communication data (comprising a message and discriminating information) and having a larger size than that of the communication buffer is to be transferred, therefore, that communication data must be divided by the program of the send side into parts each having the size of the communication buffer and a plurality of communication operations must thus be performed. Therefore, the CPU overhead of the subsystem of the send side and the subsystem of the receive side for communication increases with the number of communication operations.

On the other hand, an increase in the number of communication operations can be prevented by preparing beforehand an area, which is sufficiently larger than various communication data, as a communication buffer. Since a portion which is not actually used is produced in the shared memory device, however, the efficiency of utilization of the shared memory device is lowered.

(3) Further, if each subsystem has one communication buffer as described in JP-A-60-237556, the above described plurality of communication operations must be performed one after another. That is to say, the communication buffer is occupied by a single communication operation. Therefore, the subsystem of the send side cannot get into the next communication operation until it is confirmed that the subsystem of the receive side has received the message. As a result, the time required for communication is prolonged.

Further, even if a plurality of communication operations are not obtained as a result of dividing a single communication as described above but comprise a large number of independent communication operations, which are respectively different in combination of programs at the send side and the receive side but are the same in subsystems at the send side and the receive side, the communication operations are performed one after another in the same way, resulting in a prolonged communication time.

(4) Further, if the communication operations are performed one after another as described above, a plurality of communication operations have a wait. Therefore, control of the resultant queue becomes necessary in the subsystem of the send side. That is to say, in case the OS of a subsystem is requested to send by a plurality of programs in that subsystem one after another, the OS must keep a second operation and succeeding operations waiting in order during the first communication operation by making a queue, for example, and must perform control so that the second communication operation may be started upon termination of the first communication operation. Therefore, the CPU overhead for queue control increases.

SUMMARY OF THE INVENTION

A principal object of the present invention is to solve the problems described above in (1) to (4).

In order to solve the problem described above in (1), a multiprocessor system according to the present invention comprises means for dividing communication data into discriminating information specifying a program which should receive a message and a message to be sent to the receive program and for sending the communication data, means for holding the discriminating information, and means for receiving the discriminating information. In order to solve the problem described above in (2), a communication buffer area having a variable size corresponding to a request issued from a send program is secured, as occasion demands, on the memory included in a shared memory device, for storing the message supplied from that send program.

In order to solve the problem described above in (3), a communication ID for specifying the receive program at respective bit positions is used as the above described discriminating information. In order to solve the problem described in (4), there is provided means for holding the logical sum of a plurality of communication IDs in storing the above described discriminating information.

BRIEF DESCRIPTION OF THE DRAWING

FIG. 8 is a diagram showing the procedure of message transfer; and

DESCRIPTION OF THE PREFERRED EMBODIMENT

Figure 1:
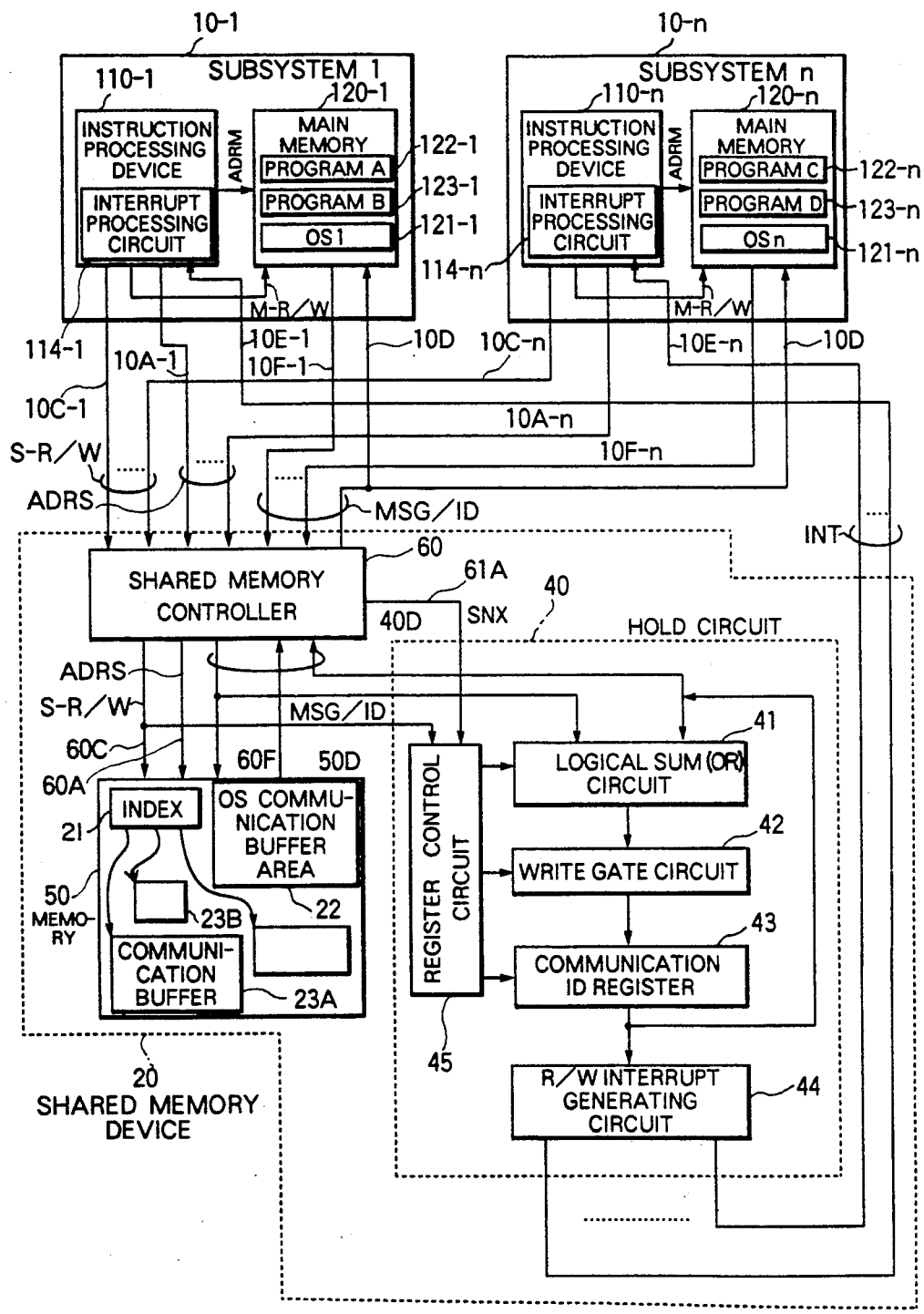
FIG. 1 is a system configuration diagram of an embodiment of the present invention.

An embodiment of the present invention will hereafter be described by referring to the drawings.

Summary of Apparatus Configuration

FIG. 1 is a block diagram showing the system configuration of the present embodiment. The system comprises n subsystems 10-1 to 10-n and a shared memory device 20 shared by the subsystems. Each subsystem operates under the control of one OS. Each subsystem may comprise a plurality of instruction processing devices. For brevity, however, the case where each subsystem 10-$i$, ($i=1, \ldots, n$) comprises one instruction processing device 110-$i$ and a main memory device 120-$i$ will now be described. For brevity, the suffix i for identifying each subsystem is omitted in the following description so long as misunderstanding is not caused. The shared memory device 20 comprises a shared memory controller 60 for selecting one of requests made by subsystems, a memory 50 comprising a RAM, and a hold circuit 40 according to a feature of the present invention.

The hold circuit 40 comprises an OR circuit 41, a gate 42, a communication ID register 43, a non-zero detecting circuit and read/write interrupt generating circuit 44.

The communication ID register 43 may also be disposed in the memory 50 for simplifying the circuit.

Summary of the Operation)

In one subsystem, a plurality of processing programs typically operate in parallel under the control of one OS. In a multiprocessor comprising a plurality of subsystems, not only communication between OS's but also communication between processing programs is necessary. The length of data sent/received in a communication operation between processing programs varies depending upon contents of that processing. In the present embodiment, therefore, a communication buffer having a size requested by the processing program of the send side is dynamically secured on the memory 50 included in the shared memory device 20.

For dynamically securing an area, communication between OS's is used. However, this communication need only convey information for identifying the send program and the receive program and inform of the position and the range of an area so disposed on the memory 50 included in the shared memory device 20 as to be used as a communication buffer. Even if the communication buffer is fixed, therefore, inconvenience is not caused. In the present embodiment, the communication buffer for communication between OS's is provided fixedly, whereas the communication buffer for the processing program is secured dynamically.

One scheme for dynamically securing an area will hereafter be described. It is now assumed that a certain processing program (send program) initiates communication with another processing program (receive program). OS's respectively controlling the send program and the receive program are herein referred to as send OS and receive OS. First of all, the send program informs the send OS of information representing the memory capacity required for communication and the receive program and thereby requests secureness of a communication buffer on the memory 50 included in the shared memory device 20. The send OS allocates a specified memory capacity (address and size) out of a space area on the memory included in the shared memory device 20 to this communication buffer such as 23A and allocates a bit position (one bit) not yet used out of a portion of the above described communication ID, which is discriminating information, corresponding to the receive subsystem to the communication buffer. By using communication between OS's, the send OS informs the receive OS of the leading address and size of a communication buffer newly allocated on the memory 50 included in the shared memory device 20 as well as information specifying the receive program and the bit position within the communication ID corresponding to the receive program. As a result, the send OS and the receive OS can recognize the leading address and size of the communication buffer such as 23A so disposed on the memory 50 included in the shared memory device 20 as to correspond to the receive program and recognize the bit position of the communication ID. The send OS and the receive OS respectively inform the send program and the receive program of the address and range of the communication buffer 23A on the memory 50 included in the shared memory device 20. In this way, the communication buffer 23A between the send program and the receive program is dynamically secured on the memory 50 included in the shared memory device 20.

Communication after the securement of the communication buffer 23A is performed as hereafter described. First of all, the send program writes a message to be conveyed to the receive program into the above described communication buffer and asks the send OS to perform sending. The send OS sends only a communication ID having "1" set in the bit position corresponding to the receive program. On the basis of the above described bit position, the receive OS specifies a receive program and informs the receive program of that fact. The receive program reads a message from the above described communication buffer 23A. Communication between the send program and the receive program is thus realized.

Sending and receiving a communication ID are performed as hereafter described. Instructions for the exclusive use of sending and reading out a communication ID are prepared and referred to as send instruction and receive instruction, respectively. These instructions are distinguished from instructions for reading/writing data from/onto the memory 50 included in the shared memory device 20 and are instructions for gaining access to the communication ID register 43 in the hold circuit 40 included in the shared memory device 20. The send OS issues the send instruction to the shared memory device 20 and sends the communication ID to the communication ID register 43 included in the hold circuit 40. The hold circuit 40 derives the logical sum of contents of the communication ID register 43 and the communication ID which has been transmitted and stores the resultant logical sum into this register 43. If the value stored in the register 43 is not zero, the hold circuit 40 generates an interrupt request to the corresponding receive subsystem. Upon receiving the interrupt request, the receive OS issues a receive instruction to the shared memory device 50 and asks the shared memory device 50 to read out the value of the communication ID register 43 included in the hold circuit 40. The hold circuit 40 sends contents of the register 43 to the receive OS. In addition, the hold circuit 40 clears contents of the register 43 and resets the interrupt factor.

Detailed Description

In the present embodiment, the following instructions are defined in the instruction processing devices 110-*l* to 110-*n* respectively of the subsystems 10-*l* to 10-*n*.

(1) Read and write instructions for performing data transfer between the memory 50 included in the shared memory device 20 and an area on the main memory device 120 included in each subsystem 10, In these instructions, an address within the memory 50 and an address and a size (length) within the main memory device 120 are specified as operands. The read instruction causes data transfer from the memory 50 to the main memory 120, whereas the write instruction causes data transfer from the main memory 120 to the memory 50.

(2) Send and receive instructions for performing data transfer between the communication ID register 43 included in the shared memory device 20 and an area on the main memory 120.

In these instructions, an address in the main memory 120 is specified, and the same size as the length of the communication ID register is (implicitly) specified. The send instruction causes transfer of the communication ID from the main memory 120 to the register 43, whereas the receive instruction causes transfer of the communication ID from the register 43 to the main memory. The operation of the send instruction has a feature that the logical sum with respect to the value already existing in the register 43 is derived and set at the time of transfer. The operation of the receive instruction has a feature that a part of the register 43 is cleared to "0".

Since details of the instruction operation heretofore described are described later, communication using these instructions will hereafter be described.

Figure 2:
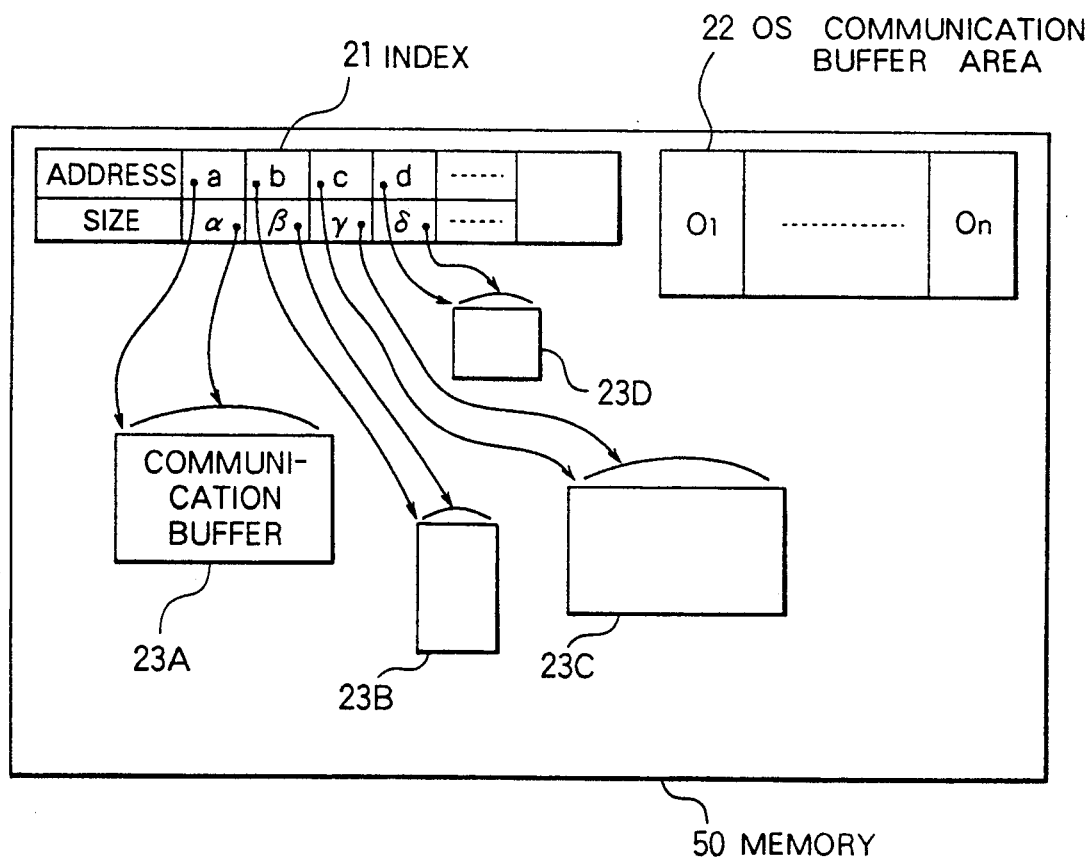
FIG. 2 is a diagram showing memory region allocation in a shared memory device of the present invention.

With reference to FIG. 1, each of the main memory devices 120-*l* to 120-*n* is divided into an area for OS and areas for respective processing programs. With reference to FIG. 1, an area 121-*l* for OS1 and areas 122-*l* and 123-*l* respectively for programs A and B are present in the main memory device 120-*l* included in the subsystem 10-*l*, whereas an area 121-*n* for OSn and areas 122-*n* and 123-*n* respectively for program C and D are present in the main memory device 120-*n* included in the subsystem 10-*n*. FIG. 2 shows data arrangement on the memory 50 included in the shared memory device 20. A part of the memory 50 of the shared memory device 20 is allocated to an index area 21 for administering area allotment on the memory 50 and a communication buffer area 22 to be used by respective OSs for communication between OSs. The remaining area is dynamically allocated to a communication buffer for messages between processing programs. With reference to FIG. 2, the number Oj of an OS communication buffer area 22 represents communication buffers 23A to 23D for communication to OSj.

Figure 3:
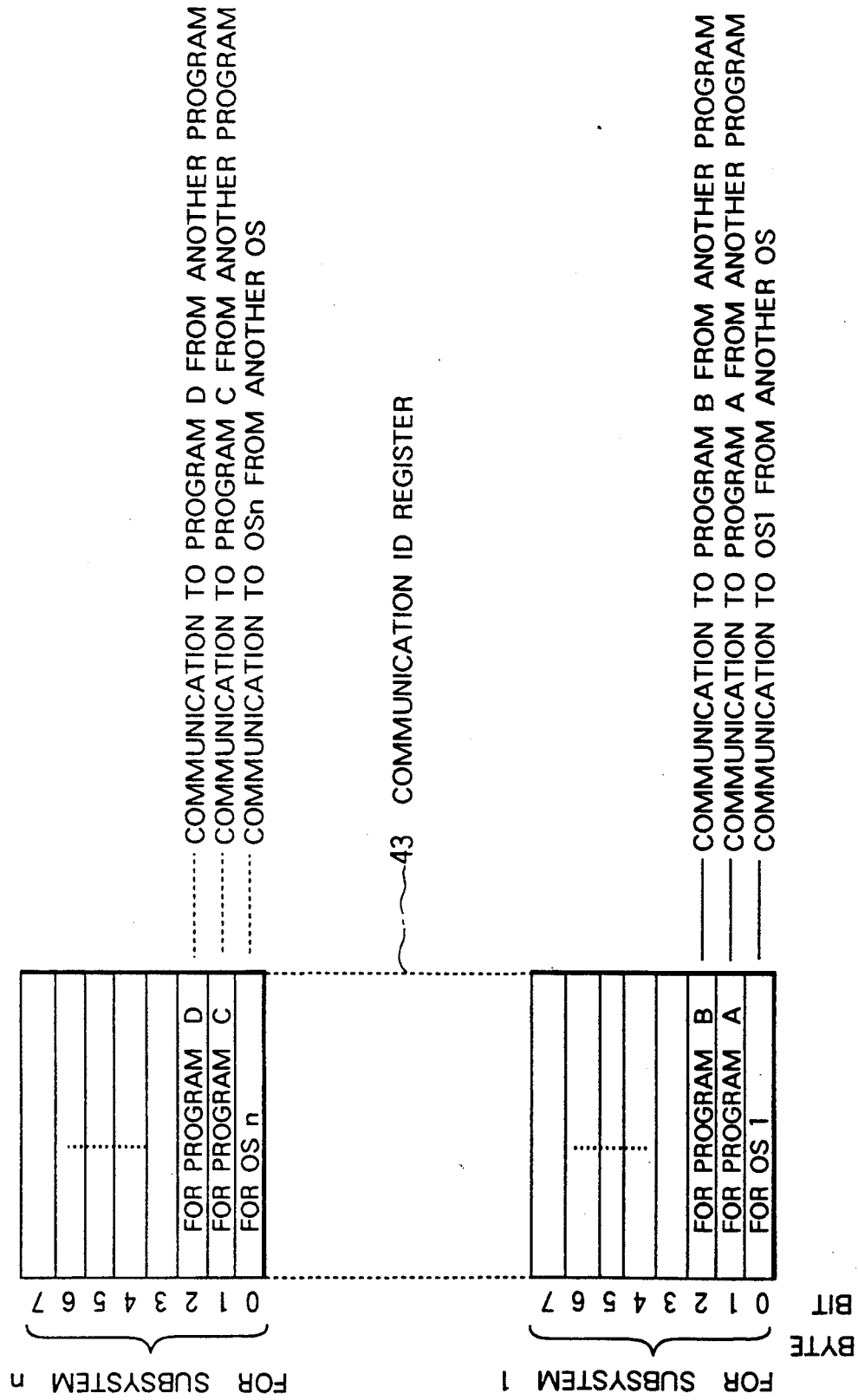
FIG. 3 is a diagram showing the structure of a register for holding a communication ID, which is discriminating information, in the embodiment.

FIG. 3 shows contents of the communication ID register 43 included in the hold circuit 40 in the present embodiment. The communication ID register 43 comprises n bytes. Each byte corresponds to one of the subsystems 10-*l* to 10-*n*. Bit 0 of each byte is allocated beforehand to the OS included in the corresponding subsystem. The remaining seven bits are used for one of processing programs included in that subsystem, but are dynamically allocated to a different processing program when communication is required.

Figure 7:
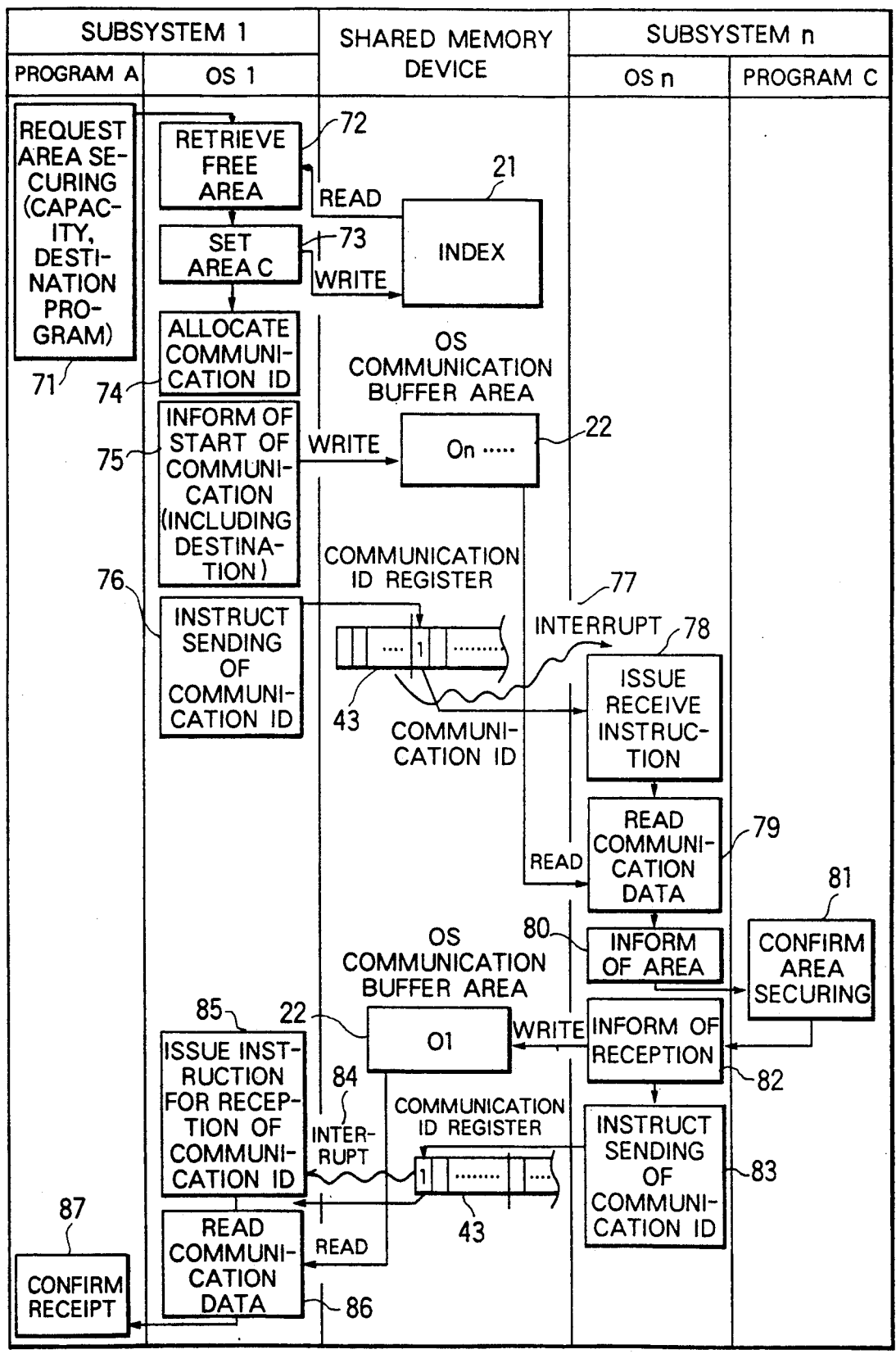
FIG. 7 is a diagram showing the dynamic allocation procedure of a communication buffer.

An example of dynamic area securement will now be described by referring to FIG. 7. It is now assumed that the processing program A operating under the control of the OS1 initiates communication with the processing program C operating under the control of the OSn. The processing program A informs the OS1 of communication control data such as the capacity of the communication buffer on the memory 50 included in the shared memory device 40 required for communication and the fact that the destination is the processing program C (step 71). By referring to the index area 21 on the memory 50 included in the shared memory device 40, an area already in use can be known. Therefore, the OSl examines the size of a free area (step 72). The OSl secures an area having the capacity of the communication buffer informed of by the program A such as the communication buffer area 23C in that free area and writes its leading address and size into the index area 21 (step 73). Further, on the basis of the fact that the processing program C is present in the subsystem 10-$n$, the OSl allocates one bit out of an n-th byte (byte n) of the communication ID to this processing program C (step 74). In the present example, a zeroth bit (bit 0) located at the beginning of the n-th byte (byte n) is allocated beforehand to the OSn. Therefore, a succeeding first bit (bit 1) is allocated to this processing program C. The OSl writes the address and size of the allocated communication buffer 23C on the memory 50 included in the shared memory device 20, the name of the receive program C, and information representing the bit position (the first bit or bit 1 of the n-th byte or byte n in the present example) corresponding to its receive processing program C included in the communication ID into an area On included in the OS communication buffer area 22 (step 75). Thereafter, the OSl issues a send instruction which specifies a communication ID having zeroth bit (bit 0) of the n-th byte (byte n) so set at "1" as to mean OSn step 76). The hold circuit 40 writes this communication ID into the register 43. When a communication ID is to be newly written into the communication ID register 43, the logical sum of the communication ID held there until then and the new communication ID derived in an OR circuit or a logical sum circuit is written. In response to a bit having a value "1" and included in this communication ID, the R/W interrupt generating circuit 44 interrupts the corresponding subsystem 10-$n$ (step 77). Upon receiving the interrupt, the OSn issues a receive instruction and reads out the communication ID from the communication register 43 (step 78). Since the bit of the communication ID representing the OSn has become "1", the OSn reads out the area On of the OS communication buffer area 22, and receives the address and size of the communication buffer 23C currently allocated to the origin of the request on the memory 50 included in the shared memory device 20, the bit position (the first bit or bit 1 of the n-th byte or byte n in the present example) of the communication ID, and communication control data indicating that the receive program is C (step 79). The OSn further informs the processing program C of the address and size of this communication buffer 23C (step 80). This processing program C issues confirmation that this information has been received to the OSn (step 81). The OSn writes the fact that this communication control data has bee received into the area Ol of the OS communication buffer area 22 (step 82). The OSn makes contact with the OSl in a way similar to that of the foregoing description by using a send instruction which specifies a communication ID having the zeroth bit (bit 0) of the first byte (byte 1) indicating the OSl set at "1" as the communication ID (step 83). Thereafter, the OSl informs the processing program A of the leading address and size of the communication buffer area 23C by using similar processing (steps 84 to 87). As a result, the communication buffer 23C for communication from the processing program A to the processing program C is dynamically secured. In the same way, dynamic securement of the communication buffer area 23A required for communication from the processing program C to the processing program A can be performed by a similar procedure. In general, a two-way communication path becomes necessary. The communication buffer 23C for communication from the processing program A to the processing program C and the communication buffer 23A for communication from the processing program C to the processing program A may be simultaneously secured at a time. Or one area may be divided into halves so that the former half will be used for sending and the latter half will be used for receiving.

Once the communication buffer 23C is secured, transfer of the communication message from the processing program A to the processing program C is performed as hereafter described. The transfer procedure of the communication message is shown in FIG. 8. First of all, the processing program A writes a message to be conveyed to the processing program C into the communication buffer area 23C by using a write instruction for the shared memory device 20, for example, (step 90) and requests the OSl to send by using a supervisor macro, for example (step 92). The OSl specifies a communication ID having "1" set in the position of a bit (the first bit or bit 1 of the n-th byte or byte n), which means communication to the processing program C, as the operand and issues a send instruction (step 94). When this communication ID is written into the register 43, interruption is made with respect to this subsystem 10-$n$ in the same way as the foregoing description (step 96). The OSn issues a receive instruction (step 98). On the basis of the above described bit position, the OSn specifies the processing program C and informs the processing program C that a message should be received (step 100). The processing program C reads out a message from the communication buffer area 23C by using a read instruction with respect to the shared memory device 20. Communication between programs is thus realized.

The communication buffer area storing a message is thus referred to directly by the processing program. Therefore, transfer comprising two stages in which a message is temporarily copied into the OS area 121-$n$ included in the main memory device 120-$n$ becomes unnecessary. Further, since the communication buffer between processing programs is dynamically secured, the memory area 50 included in the shared memory device 20 and having a capacity as large as is needed for communication.

A more desirable operation mode in the present embodiment will hereafter be described.

It is now assumed that the communication buffer areas 23A, 23B, 23C and 23D are secured on the memory included in the shared memory device as shown in FIG. 2 and bits of communication ID are so allocated as to correspond thereto as shown in FIG. 3. That is to say, the area 23A is a communication buffer for communication from the processing program C to the processing program A, for example, and the area 23B is a communication buffer for communication from the processing program D to the processing program B, for example. The area 23C is a communication buffer for communication from the processing program A to the processing program C, for example, and the area 23D is a communication buffer for communication from the processing program B to the processing program D, for example. Bit positions of the communication ID corresponding to them are the first bit (bit 1) of the first byte (byte 1), the second bit (bit 2) of the first byte (byte 1), the first bit (bit 1) of the n-th byte (byte n) and the second bit (bit 2) of the n-th byte (byte n), respectively.

Figure 9:
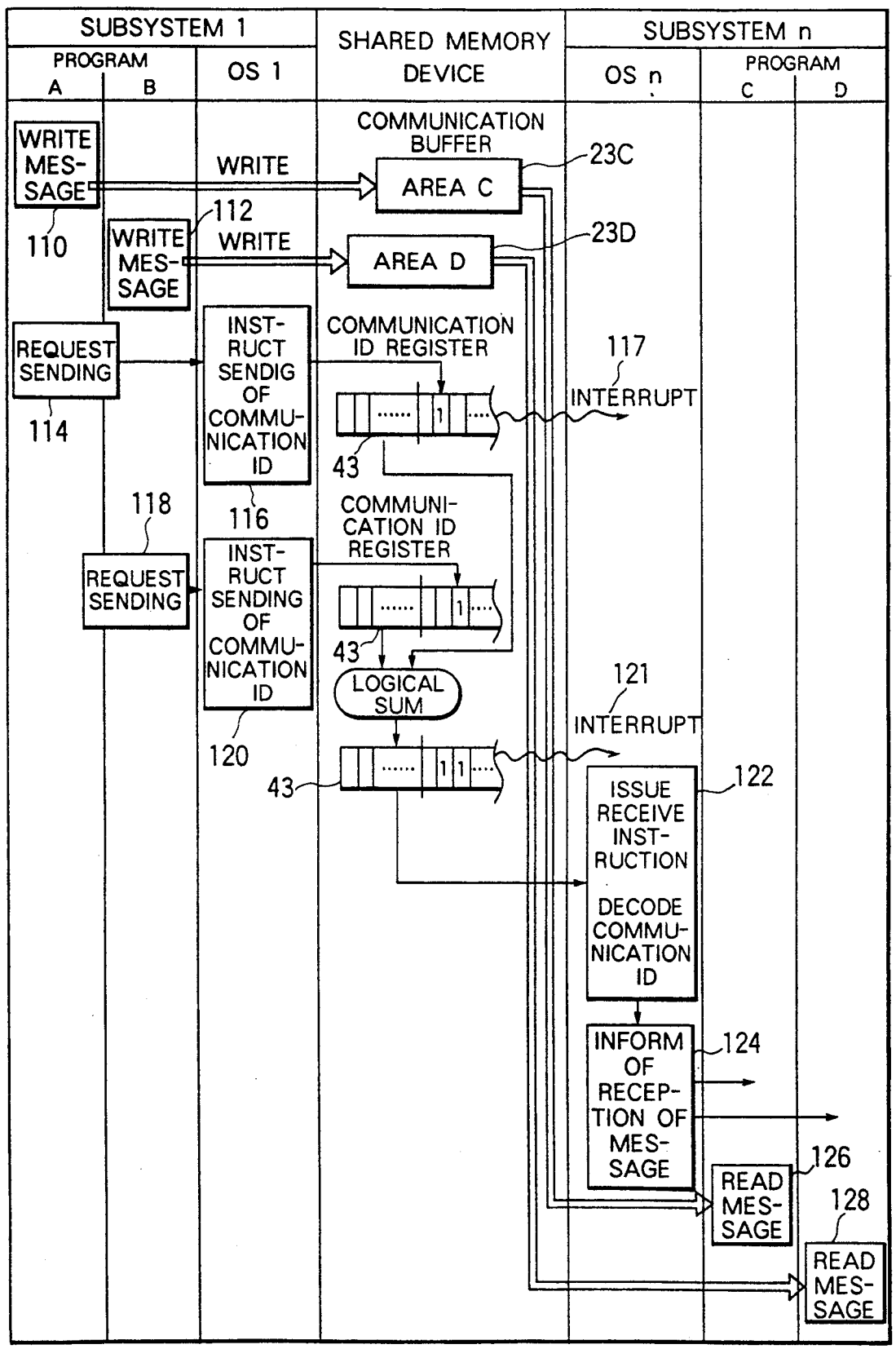
FIG. 9 is a diagram showing the procedure of communication performed among a plurality of programs.

A case where communication from the processing program A to the processing program C and communication from the processing program B to the processing program D are performed under the above described circumstances will now be described by referring to FIG. 9. Since the area 23C is separated from the area 23D, message writing of the processing programs A and B can be executed independently (in parallel conceptually) (steps 110 and 112). A send request is addressed to the OS1 by the processing program A (step 114). The OS1 sets "1" in the first bit (bit 1) of the n-th byte (byte n) of the communication ID and issues a send instruction (step 116). When this communication ID is written into the register 43, on interrupt with respect to the OSn is generated (step 117). When a send request is addressed thereafter to the OS1 by the processing program B (step 118), the OS1 can consecutively issue a send instruction by setting "1" in the second bit (bit 2) of the n-th byte (byte n) of the communication ID (step 120). That is to say, the next send instruction can be issued before the OS2 issues a receive instruction with respect to an interrupt based upon the first send instruction. The communication ID is OR-ed in the hold circuit 40 of FIG. 1 with that held in the communication ID register 43 until then, and the result is preserved in the communication ID register 43. With respect to the renewal of the communication ID register 43, an interrupt to the OSn is newly caused. Thereafter, the OSn issues a receive instruction and reads out the communication ID (step 122). Since both the first and second bits (bit 1 and bit 2) of the n-th byte (byte n) are "1", the OSn informs both the processing programs C and D (step 124). The processing programs C and D can read out messages respectively from the areas 23C and 23D independently (in parallel conceptually) (steps 126 and 128).

In case the processing programs A and B address send requests to OS1 simultaneously, the operation heretofore described may also, be altered as follows. That is to say, by setting "1" in a plurality of bits of the communication ID such as bits 1 and 2 of the byte n, the OS1 can communicate with a plurality of processing programs such as the programs C and D by using a send instruction once. A case where the origin of the send request is a single program and a plurality of destinations are involved (i.e., the so-called broadcast) can be simply realized by making a plurality of bits of the communication ID equivalent to "1".

In this way, a plurality of independent communications can be executed in parallel, and hence the communication time is shortened. Further, since a wait in the OS1 is not caused, it becomes unnecessary to make a queue. Paying attention to a certain processing program, the communication is bilateral. In many cases, the next communication is not performed until the receipt of a message is confirmed. Therefore, the queue control within the processing program becomes very simple or practically unnecessary.

Configuration of each of devices shown in FIG. 1 will hereafter be described in detail by referring to drawing.

Figure 4:
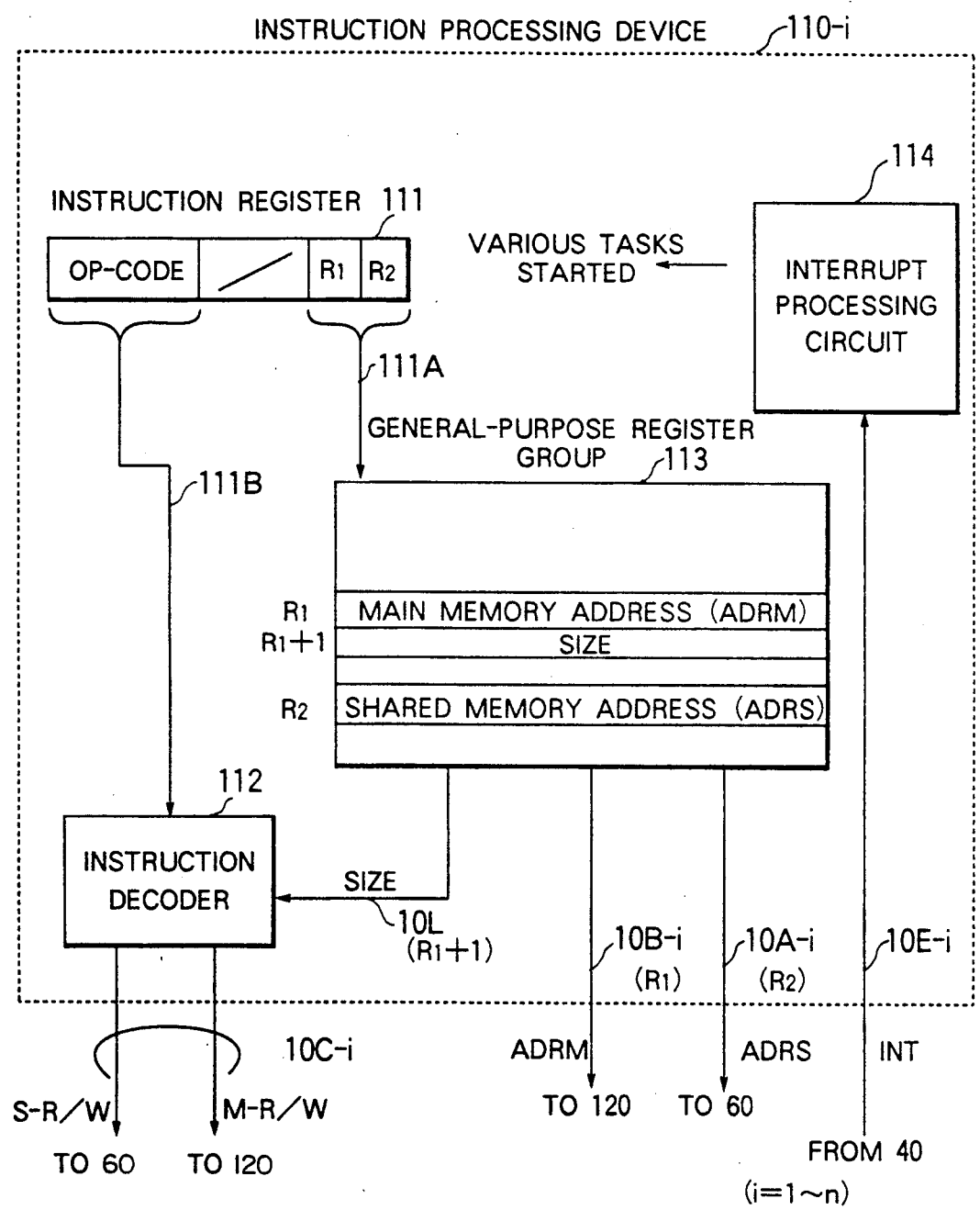
FIG. 4 is a configuration diagram of an instruction processing device 110 shown in FIG. 1.

FIG. 4 is a block diagram showing the configuration of a part of the instruction processing device 110 shown in FIG. 1, which relates to the present communication scheme. FIG. 4 shows an instruction register 111, an instruction decoder 112 and a general-purpose register group 113.

In the present embodiment, each of the send instruction and receive instruction as well as the data read instruction and write instruction for data on the memory included in the shared memory device comprises an operation code and a portion specifying the address and the like. It is now supposed that the RRE form used in IBM system 370 is used as the instruction form. That is to say, each instruction word has a length of four bytes and comprises two bytes of operation code, one byte specifying numbers of two general-purpose registers (R1 and R2), and another byte. The general-purpose register denoted by R1 specifies the address of data on the main memory device. A general-purpose register R1+1 following the register R1 specifies the size. The general-purpose register R2 specifies the address on the memory included in the shared memory device. The send instruction and receive instruction do not gain access to data on the memory included in the shared memory device and hence do not use the R2 portion.

Instruction processing in the subsystem 10-l will now be described by referring to FIG. 4. Portions R1 and R2 are supplied to the general-purpose register group 113 via a line 111A. Contents of registers corresponding thereto as already described are read out. That is to say, the address on the main memory device stored in the general-purpose register R1 is outputted on a line 10B. The address on the memory included in the shared memory device is outputted on a line 10A. The size stored in the general-purpose register R1+1 is outputted on a line 10L. The instrrction decoder 112 decodes the operation code on a line 111B and the size represented by the signal on the line 10L to output a control signal 10C. The control signal 10C indicates the kind and length of an instruction. As the kind of the instruction, the operation code itself may be outputted. As for the length, the value itself on the line 10L is outputted in case of the read instruction or write instruction for data in the shared memory device. In case of the send instruction and the receive instruction, the same length as that of the communication ID (i.e., n bytes) is outputted. The main memory address 10B is sent to the main memory device 120, whereas the address 10A of the memory 50 included in the shared memory device 20 is sent to the shared memory controller 60. The control signal 10C representing the kind of an instruction is sent to both the main memory device 120 and the shared memory controller 60. In case of the send instruction and the receive instruction, the address 10A of the memory included in the shared memory device is not used.

When an interrupt signal 10E supplied from the hold circuit 40 is "1", an interrupt processing circuit 114 shown in FIG. 4 generates an interrupt in the instruction processing device and starts various tasks. The interrupt processing circuit 114 is configured in the same way as the prior art. The interrupt signal 10E supplied from the hold circuit 40 is positioned as one of external interrupt signals, for example.

Referring back to FIG. 1, control of processing for each instruction will now be described.

In case the instruction word is the instruction for reading data from the memory included in the shared memory device, the shared memory controller 60 reads out data stored in an area starting with the address 10A and having the length indicated by the control line 10C from the memory 50 onto a data line 10D, whereas the main memory device 120 writes data having a specified length supplied via the data line 10D into an area starting with the address 10B.

In case the instruction word is the write instruction with respect to the shared memory, the main memory device 120 reads out data having a length indicated by the control line 10C from the area starting with the address 10B onto a data line 10F, whereas the shared memory controller 60 writes data having a specified length supplied via the data line 10F into an area of the memory 50 starting with the address 10A.

In case the instruction word is the send instruction, the main memory device 120 reads out data (i.e. communication ID) having a length (i.e., n bytes) indicated by the control line 10C from an area starting with the address 10A onto the data line 10F, whereas the shared memory controller 60 transfers the communication ID supplied via the data line 10F to the hold circuit 40.

In case the instruction word is the receive instruction, the shared memory controller 60 reads out contents of the register 43 from the hold circuit 40 onto the data line 10D, whereas the main memory device 120 writes the contents supplied via the data line 10D into an area starting with the address 10A.

Figure 5:
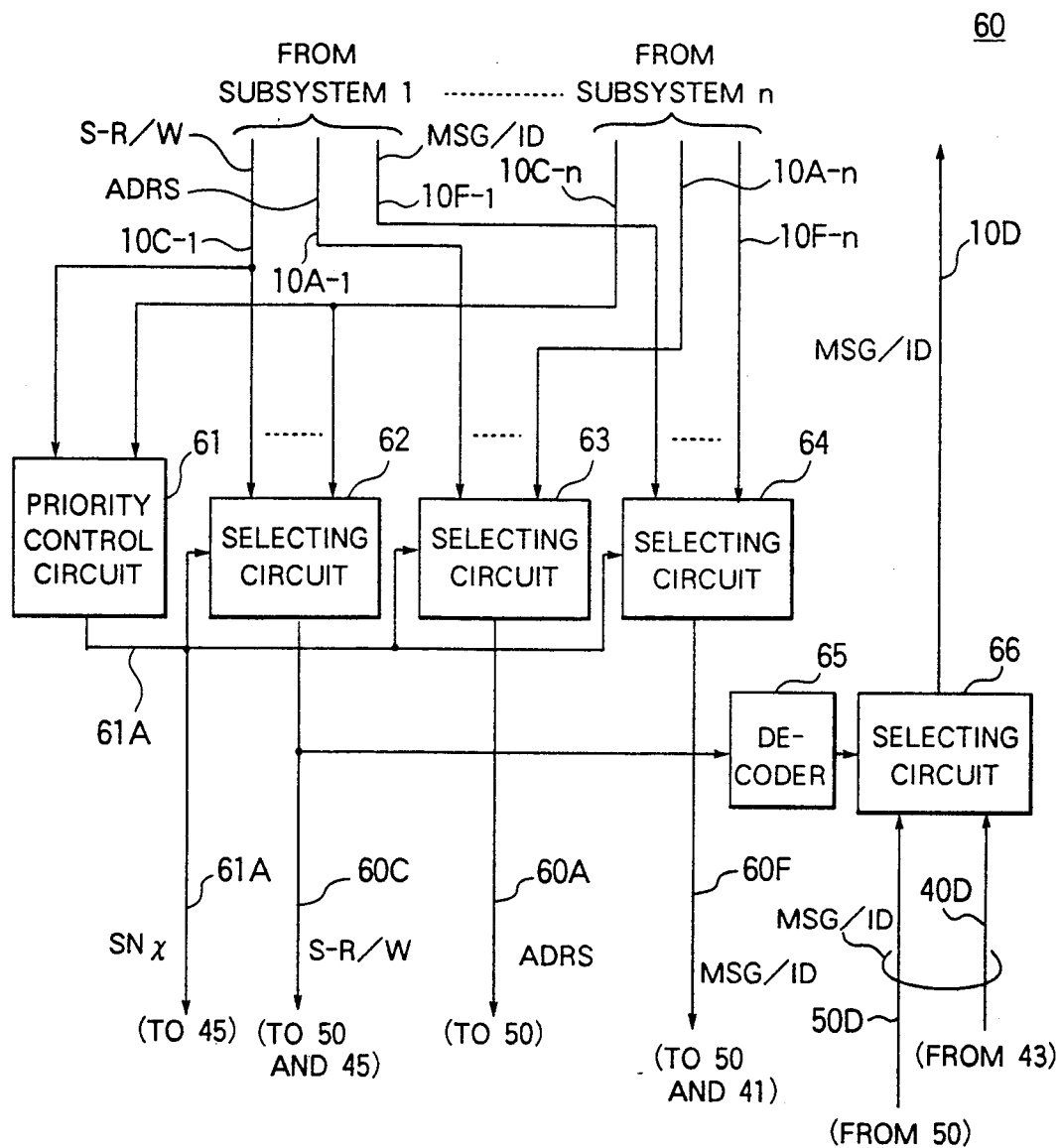
FIG. 5 is a configuration diagram of a shared memory controller 60 shown in FIG. 1.

FIG. 5 shows an example of the shared memory controller 60. Control lines 10C-1 to 10C-n supplied from respective subsystems are coupled to a priority control circuit 61 and a selecting circuit 62. Address lines 10A-1 to 10A-n are coupled to a selecting circuit 63. Data lines 10F-1 to 10F-n are coupled to a selecting circuit 64. The priority control circuit 61 selects one of requests with priority to a request supplied earlier, for example, and outputs the selected request onto a selecting line 61A. In accordance with the selecting line 61A, the selecting circuits 62, 63 and 64 perform one-out-of-n selection and output selected ones onto a control line 60C, an address line 60A and a data line 60F, respectively. The selected signal on the control line 60C is decoded by a decoder 65 to control a selecting circuit 66. If the request is the read instruction for the memory included in the shared memory device, data supplied from the memory 50 via a data line 50D are outputted onto a data line 10D by the selecting circuit 66. If the request is the receive instruction, data supplied from the register 43 via a data line 40D are outputted onto the data line 10D.

Figure 6:
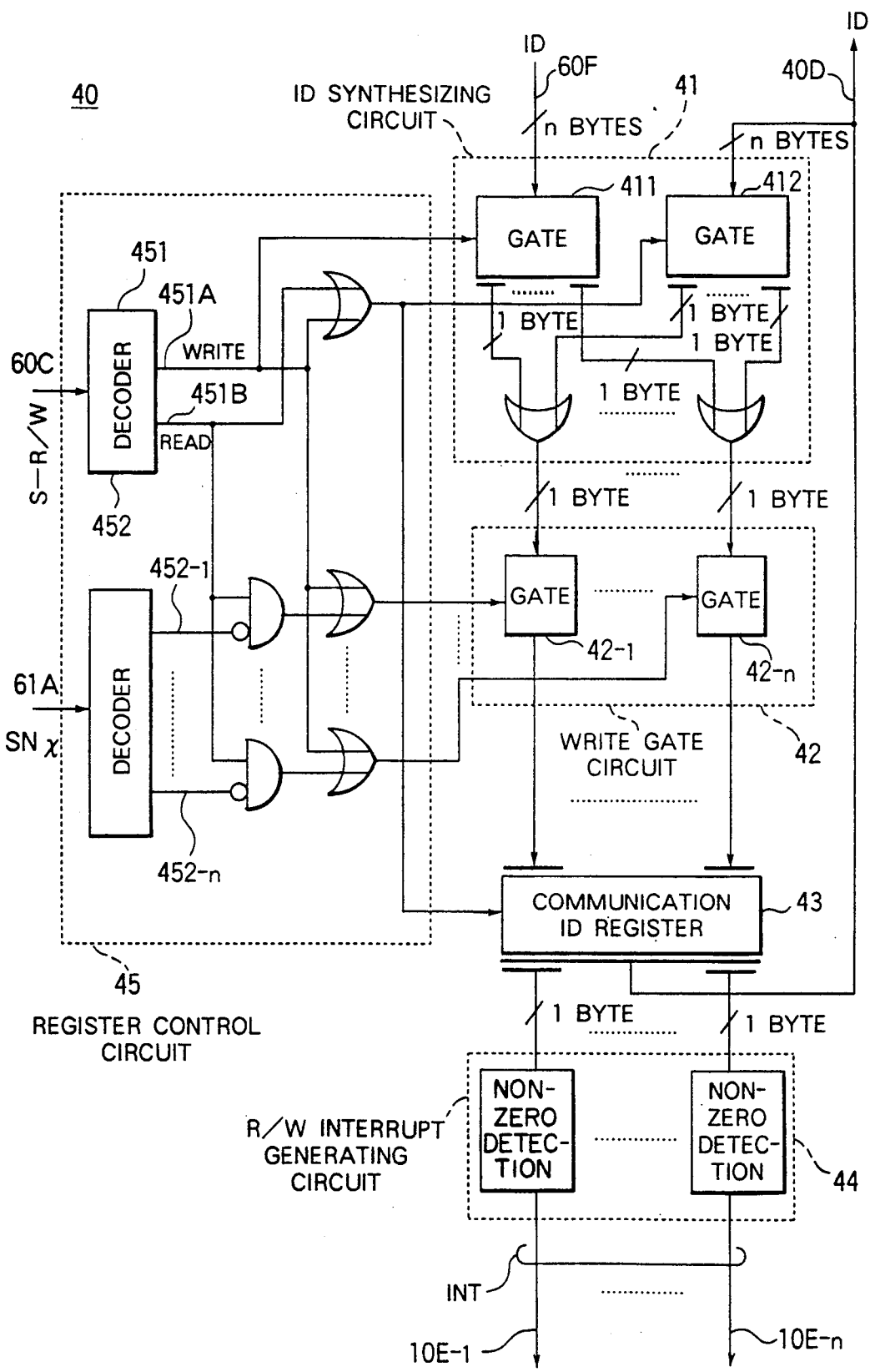
FIG. 6 is a configuration diagram of a hold circuit 40 shown in FIG. 1.

FIG. 6 shows an example of detailed configuration of the hold circuit 40 shown in FIG. 1. A signal on the control line 60C is decoded by a decoder 451. In case of the send instruction, output is obtained on a line 451A. In case of the receive instruction, output is obtained on a line 451B.

In case of the send instruction, the output signal on the line 451 opens gates 411 and 412. Logical sum of the communication ID on the data line 60F and contents of the register 43 supplied via the data line D is set into the register 43 via opened gates 42-1 to 42-n.

In case of the receive instruction, only the gate 412 is opened by the signal on the line 451B (while the gate 411 is still closed) to supply the contents of the register 43 appearing on the data line 40D to the gates 42-1 to 42-n as they are. By using the selecting line 61A, it is possible to know which subsystem has addressed the request. By decoding the signal supplied on the selecting line 61A in a decoder 452, therefore, a corresponding one of lines 452-1 to 452-n has a logic "1". Inverted signals of them are ANDed with the signal on the line 451B representing the receive instruction. Only a corresponding one of the gates 42-1 to 42-n is closed, and the contents of the register 43 are set into the register 43. As a result, only a corresponding one byte of the register 43 can be reset.

The non-zero detection circuit 44 checks for non-zero data while taking a byte as the unit and outputs the results on interrupt request lines 10E-1 to 10E-n. When the receive instruction has been executed, a byte included therein and corresponding to the subsystem of the origin of issue is reset. Therefore, the interrupt request corresponding to that subsystem is removed.

In the foregoing description, the communication ID register 43 is provided separately from the memory 50. However, this register 43 may also be disposed within the memory 50.

The present invention brings about the following effects.

(1) In case the message between programs included in communication data is separated from discriminating information meaning the destination and the like, the processing program directly gains access to the memory included in the shared memory device and the message does not pass through the OS. Therefore, data sending and receiving between the OS and each program become unnecessary, resulting in a higher communication efficiency.

(2) In case the communication buffer area on the memory included in the shared memory device for storing the message is set according to the program, it is not necessary to divide a large amount of data before sending it and the memory included in the shared memory device can be utilized effectively according to the quantity of the message.

(3) In case a plurality of communication buffers are provided for the communication message, communications can be performed in parallel.

(4) In case the logical sum of communication IDs, each of which is discriminating information, is adapted to be received collectively by using the receive instruction, a queue need not be made and a plurality of independent communications can be performed in parallel.

Further, in case programs are associated with respective bits of the communication ID as in the present embodiment and "1" is set into a plurality of bits of the communication ID, communication to a plurality of processing programs by using the send instruction at a time, i.e., the so-called broadcast can be simply realized.

We claim:

1. In a multiprocessor system including a plurality of subsystems and a shared memory device, each of said plurality of subsystems having at least one instruction processor and a main memory, and each subsystem executing a plurality of programs under control of an operating system, said shared memory device having a random access memory connected to said plurality of subsystems to be accessed thereby, a method for communication between said subsystems via said shared memory device comprising the steps of:

(a) writing a message into a communication buffer in said random access memory of said shared memory device with a sending-side subsystem, the sending-side subsystem including a sending-side program for sending said message, and informing said shared memory device with said sending-side subsystem of communication discriminating information specifying a receiving-side program of a receiving-side subsystem which is to receive said message;

(b) reading out said communication discriminating information from said shared memory device with a receiving-side operating system of said receiving-side subsystem, and, responsive to said read out communication discriminating information, directing said receiving-side program to receive said message with the receiving-side operating system; and (c) reading out said message from said communication buffer with said receiving-side program in response to said directing of said receiving-side program performed with said receiving-side operating system.

2. A communication method according to claim 1, wherein said step (a) comprises the steps of:
(a1) writing said message into said communication buffer with said sending-side program; and
(a2) informing said shared memory device of said communication discriminating information with a sending-side operating system of the sending-side subsystem.

3. A communication method according to claim 2, wherein said step (a) further comprises the steps of:
(a3) informing said sending-side operating system of said receiving-side program with said sending-side program; and
(a4) generating said communication discriminating information with said sending-side operating system in response to the informing of said receiving-side program performed with said sending-side program.

4. A communication method according to claim 1, wherein said step (b) comprises the steps of:
(b1) informing, with said shared memory device, the receiving-side operating system of the existence of said message to be received by said receiving-side program in response to said communication discriminating information; and
(b2) reading out said communication discriminating information with said receiving-side operating system in response to said informing of the existence of said message performed with said shared memory device.

5. A communication method according to claim 4, wherein said informing of the existence of said message in said step (b1) is performed by issuing an interrupt to said receiving-side operating system with said shared memory device.

6. A communication method according to claim 4, wherein said communication discriminating information comprises information specifying said receiving-side program in a manner enabling said receiving-side operating system to discriminate said receiving-side program from said communication discriminating information.

7. A communication method according to claim 1, further comprising the steps of:
(1) writing another message to be sent from another sending-side program of said sending-side subsystem to another receiving-side program controlled by said receiving-side operating system into another communication buffer in said random access memory of said shared memory device with said sending-side subsystem, and informing said shared memory device with said sending-side subsystem of another communication discriminating information specifying said another receiving-side program which is to receive said another message;

(2) reading out said another communication discriminating information from said shared memory device with said receiving-side operating system, and directing said another receiving-side program to receive the another message with said receiving-side operating system in response to said read out another communication discriminating information; and (3) reading out said another message from said another communication buffer with said another receiving-side program in response to said directing of said another receiving-side program performed with said receiving-side operating system, said steps (1) to (3) being executed in parallel with said steps (a) to (c).

8. A communication method according to claim 7, wherein said communication discriminating information and said another communication discriminating information are held by said shared memory device so as to be distinguishable from each other if said shared memory device is informed of said another communication discriminating information in said step (1) before said communication discriminating information informed to said shared memory device in said step (a) is read out in said step (b).

9. A communication method according to claim 8, further comprising the step of combining, with said shared memory device, said communication discriminating information informed to said shared memory device in said step (a) with said another communication discriminating information informed to said shared memory device in said step (1) into single communication discriminating information which specifies both the receiving-side program and the another receiving-side program.

10. A communication method according to claim 7, wherein said step (2) further comprises the steps of:
(2a) informing said receiving-side operating system of the existence of said another message to be received by said another receiving-side program with said shared memory device in response to said another communication discriminating information; and
(2b) reading out said another communication discriminating information with said receiving-side operating system in response to said informing step (4) of the existence of said another message performed with said shared memory device.

11. In a multiprocessor system including a plurality of subsystems and a shared memory device, each of said plurality of subsystems having at least one instruction processor and a main memory, and each subsystem executing a plurality of programs under control of an operating system, said shared memory device having a random access memory connected to said plurality of subsystems to be accessed thereby, a method for communication between said subsystems via said shared memory device comprising the steps of:
(a) writing a message into a communication buffer in said random access memory of said shared memory device with a sending side-program, the sending-side program being a program for sending said message, and requesting, with the sending-side program, a sending-side operating system which controls said sending-side program to send said message to a receiving-side program which is to receive said message;

(b) informing said shared memory device with said sending-side operating system of communication discriminating information specifying said receiving-side program;

(c) informing, with said shared memory device, a receiving-side operating system which controls said receiving-side program of the existence of said message to be received by said receiving-side program in response to said communication discriminating information;

(d) reading out said communication discriminating information from said shared memory device with said receiving-side operating system, and directing, with said receiving-side operating system, said receiving-side program to receive said message in response to said read out communication discriminating information; and (e) reading out said message from said communication buffer with said receiving-side program in response to said directing of said receiving-side program performed with said receiving-side operating system.

12. A communication method according to claim 11, wherein said informing of the existence of said message in said step (c) is performed by issuing an interrupt to said receiving-side operating system with said shared memory device.

13. A communication method according to claim 11, wherein said step (a) comprises the steps of:

(a1) requesting, with said sending-side program, said sending-side operating system to secure said communication buffer in said random access memory before writing said message into said communication buffer with said sending-side program; and (a2) securing, with said sending-side operating system, said communication buffer in said random access memory before writing said message into said communication buffer with said sending-side program in response to said requesting in said step (a1).

14. A communication method according to claim 13, wherein said requesting in said step a(1) includes informing said sending-side operating system of a size of said communication buffer with said sending-side program, and wherein said securing in said step (a2) includes securing said communication buffer in said random access memory with said sending-side operating system such that said secured communication buffer has said size.

15. A communication method according claim 13, wherein said step (a) further comprises the steps of:

(a3) informing said sending-side program of an address of said secured communication buffer in said random access memory with said sending-side operating system;

(a4) informing, with said sending-side operating system, said shared memory device of the address of said secured communication buffer and program discriminating information specifying said receiving-side program as communication control information for said receiving-side operating system;

(a5) informing, with said sending-side operating system, said shared memory device of communication discriminating information specifying said receiving-side operating system;

(a6) informing, with said shared memory device, said receiving-side operating system of the existence of said message to be received by said receiving-side program in response to said communication control information;

(a7) reading out said communication control information from said shared memory device with said receiving-side operating system; and (a8) informing said receiving-side program of the address of said secured communication buffer with said receiving-side operating system in response to said read out communication control information.

16. A communication method according to claim 15, wherein said informing of the existence of said message in said step (a6) is performed by issuing an interrupt to said receiving-side operating system with said shared memory device.

17. A communication method according to claim 11, further comprising the steps of:

(1) writing another message into another communication buffer in said random access memory of said shared memory device with another sending-side program, said another sending-side program being a program controlled by said sending-side operating system;

(2) informing, with said sending-side program, said shared memory device of another communication discriminating information for specifying another receiving-side program which is controlled by said receiving-side operating system and which is to receive said another message;

(3) informing, with said shared memory device, said receiving-side operating system of the existence of said another message to be received by said another receiving-side program in response to said another communication discriminating information;

(4) reading out said another communication discriminating information from said shared memory device with said receiving-side operating system, and directing, with said receiving-side operating system, and said another receiving-side program to receive said another message in response to said read out another communication discriminating information; and (5) reading out said another message from said another communication buffer with said another receiving-side program in response to said directing of said another receiving-side program performed with said receiving-side operating system, said steps (1) to (5) being executed in parallel with said steps (a) to (e).

18. A communication method according to claim 17, wherein said communication discriminating information and said another communication discriminating information are held by said shared memory device so as to be distinguishable from each other if said shared memory device is informed of said another communication discriminating information in said step (2) before said communication discriminating information informed to said shared memory device in said step (b) is read out in said step (d).

19. A communication method according to claim 18, further comprising the step of combining, with said shared memory device, said communication discriminating information informed to said shared memory device in said step (b) with said another communication discriminating information informed to said shared memory device in said step (2) into single communication discriminating information which specifies both the receiving-side program and the another receiving-side program.

20. In a multiprocessor system including a plurality of subsystems and a shared memory device, each of said plurality of subsystems having at least one instruction processor and a main memory, and each subsystem executing a plurality of programs under control of an operating systems, said shared memory device having a random access memory connected to said plurality of subsystems to be accessed thereby, a method for communication between said subsystems via said shared device comprising the steps of:

(a) informing, with a sending-side subsystem, said shared memory device of communication control information required for control of communication of a message to be sent by a sending-side program of said sending-side subsystem to a receiving-side subsystem and first communication discriminating information specifying a receiving-side operating system of a receiving-side subsystem to which a receiving-side program which is to receive the message belongs when said communication control information is to be sent from said sending-side subsystem to said receiving-side subsystem;

informing, with said sending-side subsystem, said shared memory device of said message and second communication discriminating information specifying said receiving-side program when said message is to be sent from said sending-side subsystem to said receiving-side subsystem;

(c) reading out communication discriminating information from said shared memory device with said receiving-side subsystem; and (d) reading out said communication control information or said message from said shared memory device with said receiving-side subsystem depending upon whether said read out communication discriminating information comprises said first communication discriminating information or said second communication discriminating information.

21. A communication method according to claim 20, wherein said step (c) comprises the steps of:

(c1) informing, with said shared memory device, said receiving-side operating system of the existence of said first communication discriminating information or said second communication discriminating information in response to said first communication discriminating information or said second communication discriminating information, respectively; and (c2) reading out said communication discriminating information with said receiving-side operating system in response to said informing of the existence of said first communication discriminating information or said second communication discriminating information performed with said shared memory device.

22. A communication method according to claim 21, wherein said informing of the existence of said first communication discriminating information or said second discriminating information is performed by issuing an interrupt to said receiving-side operating system with said shared memory device.

23. A communication method according to claim 20, wherein said step (a) comprises the steps of:

(a1) informing, with said sending-side program, a sending-side operating system of said sending-side subsystem which controls said sending-side program of said receiving-side program;

(a2) informing, with said sending-side operating system, said shared memory device of communication control information specifying said receiving-side program; and (a3) informing, with said sending-side operating system, said shared memory device of said first communication discriminating information specifying said receiving-side operating system;

and wherein said step (b) comprises the steps of:

(b1) writing said message into a communication buffer in said random access memory of said shared memory device with said sending-side program;

(b2) requesting, with said sending-side program, said sending-side operating system to inform said shared memory device of said second communication discriminating information; and (b3) informing, with said sending-side operating system, said shared memory device of said second communication discriminating information specifying said receiving-side program in response to the requesting in said step (b2).

24. A communication method according to claim 23, wherein said step (c) comprises the step of reading out said communication discriminating information from said shared memory device with said receiving-side operating system;

and wherein said step (d) comprises the steps of:

(d1) reading out said communication control information from said shared memory device with said receiving-side operating system when said read out communication discriminating information is said first communication discriminating information;

(d2) requesting, with said receiving-side operating system, said receiving-side program to read said message from said shared memory device when said read out communication discriminating information is said second communication discriminating information; and (d3) reading out said message from said communication buffer of said shared memory device with said receiving-side program.

25. A communication method according to claim 24, wherein said step (a) further comprises the steps of:

(a4) requesting, with said sending-side program, said sending-side operating system to secure a communication buffer in said random access memory for use in said step (b1);

(a5) securing, with said sending-side operating system, said communication buffer in said random access memory in response to said requesting in said step a(4);

(a6) informing said sending-side program of an address of said secured communication buffer in said random access memory with said sending-side operating system; and (a7) informing, with said sending-side operating system, said shared memory device of the address of said secured communication buffer in said random access memory and program discriminating information specifying said receiving-side program as said communication control information;

and wherein said step (d1) comprises the step of informing, with said sending-side operating system, said receiving-side program of the address of said second communication buffer in response to said read out communication control information.

26. A communication method according to claim 25, wherein said requesting in said step (a4) includes informing said sending-side operating system of a size of said communication buffer with said sending-side program, and wherein said securing in said step (a5) includes securing said communication buffer in said random access memory with said sending-side operating system such that said secured communication buffer has said size.

27. A communication method according to claim 20, wherein said first communication discriminating information and said second communication discriminating information are held by said shared memory device so as to be distinguishable from each other if said shared memory device is informed of said second communication discriminating information in said step (b) before said first communication discriminating information informed to said shared memory device in said step (a) is read out in said step (c).

28. A communication method according to claim 27, further comprising the step of combining, with said shared memory device, said first communication discriminating information with said second communication discriminating information into single communication discriminating information.

29. In a multiprocessor system including a plurality of subsystems and a shared memory device, each of said plurality of subsystems having at least one instruction processor and a main memory, and each subsystem executing a plurality of programs under control of an operating system, said shared memory device having a random access memory connected to said plurality of subsystems to be accessed thereby, a method for communication between said subsystems via said shared memory device, comprising the steps of:
 (a) informing, with each of the subsystems, said shared memory device of communication discriminating information specifying a receiving-side program which is to receive a message or a receiving-side operating system which is to receive communication control information required for control of communication of said message, whenever said message or said communication control information is to be sent from one subsystem to another subsystem;
 (b) informing, with said shared memory device, of the existence of said message or said communication control information in response to said communication discriminating information to a receiving-side operating system for controlling a receiving-side program specified by said communication discriminating information or a receiving-side operating system specified by said communication discriminating information;
 (c) combining, with said shared memory device, communication discriminating information previously informed to said shared memory device but not yet read out from said shared memory device with communication discriminating information newly informed to said shared memory device to obtain and hold single communication discriminating information; and
 (d) reading out said single communication discriminating information held in said shared memory device with the receiving-side operating system to which the existence of said message or said communication control information was informed in said step (b).

30. In a multiprocessor system including a plurality of subsystems and a shared memory device, each of said plurality of subsystems having at least one instruction processor and a main memory, and each subsystem executing a plurality of programs under control of an operating system, said shared memory device having a random access memory connected to said plurality of subsystems to be accessed thereby, a method for communication between said subsystems comprising the steps of:
 (a) informing, with a sending-side program which is to send a message, a sending-side operating system which controls the sending-side program of a receiving-side program which is to receive said message and of a size of a communication buffer to be secured in said random access memory of said shared memory device;
 (b) securing, with said sending-side operating system, said communication buffer in said random access memory of said shared memory device such that said secured communication buffer has said size in response to said requesting in said step (a); and
 (c) sending said message with said sending-side program to said receiving-side program via said secured communication buffer.

31. A communication method according to claim 30, wherein said step (c) comprises the steps of:
 (c1) informing, with said sending-side operating system, said shared memory device of an address of said secured communication buffer in said random access memory, said size of said secured communication buffer, and program discriminating information specifying the receiving-side program as communication control information for a receiving-side operating system which controls the receiving-side program; and
 (c2) reading out said communication control information from said shared memory device with said receiving-side operating system.

32. A communication method according to claim 31, wherein said step (c) further comprises the steps of:
 (c3) informing, with said receiving-side operating system, said receiving-side program of said address of said read out communication control information;
 (c4) writing said message into said secured communication buffer with said sending-side program; and
 (c5) reading out said message from said secured communication buffer with said receiving-side program.

33. A communication method according to claim 32, wherein said step (c) further comprises the steps of:
 (c6) informing, with said sending-side operating system, at execution of said step (c1), said shared memory device of first communication discriminating information specifying said receiving-side operating system;
 (c7) informing, with said sending-side operating system, at execution of said step (c4), said shared memory device of second communication discriminating information specifying said receiving-side program;
 (c8) informing, with said shared memory device, said receiving-side operating system of the existence of said first communication discriminating information or said second communication discriminating information in response to said first communication discriminating information or said second communication discriminating information, respectively;

(c9) reading out communication discriminating information from said shared memory device with said receiving-side operating system in response to said informing in said step (c8); and (c10) executing the step (c2) or (c5) depending upon whether the read out communication discriminating information in said step (c9) is said first communication discriminating information or said second communication discriminating information.

34. A multiprocessor system comprising:
   a plurality of subsystems each having at least one instruction processor and a main memory and each executing a plurality of programs under control of an operating system;
   a shared memory device connected to said plurality of subsystems, said shared memory device including first information hold means for holding a plurality of communication information each received from one of the subsystems and to be sent to another of the subsystems, and second information hold means for holding discriminating information representing respective destinations of said held plurality of communication information; and
   control means, connected to said subsystems and said first information hold means and responsive to execution of an instruction of a first kind by one of said subsystems, for transferring communication information between said one subsystem and a location in said first information hold means specified by said instruction, and responsive to execution of an instruction of a second kind by said one subsystem, for transferring discriminating information between said one subsystem and said second information hold means.

35. A multiprocessor system according to claim 34, further comprising means, connected to said second information hold means and responsive to transfer of new discriminating information from one of said subsystems to said second information hold means, for informing a subsystem specified by said new discriminating information of the existence of said new discriminating information.

36. A multiprocessor system according to claim 35, wherein said informing means comprises means for issuing an interrupt to an operating system of said subsystem specified by said new discriminating information.

37. A multiprocessor system according to claim 34, wherein said control means comprises means, responsive to execution of an instruction of the second kind performed by one of said subsystems in order to read out discriminating information held in said second information hold means, for erasing a portion of said held discriminating information related to said one subsystem.

38. A multiprocessor system according to claim 34, wherein said control means comprises means for combining newly received discriminating information with discriminating information already held in said second information hold means to generate single discriminating information having a predetermined form and for writing said single discriminating information in said second information hold means.

39. A multiprocessor system according to claim 38, further comprising means responsive to said single discriminating information for informing a subsystem specified by said newly received discriminating information of the existence of said newly received discriminating information.

40. A multiprocessor system according to claim 34, wherein said control means comprises:
   means, responsive to execution by one of the subsystems of an instruction of the first kind for a write operation to said first information hold means, for transferring communication information specified by said instruction of the first kind for a write operation from said one subsystem to said first information hold means and for writing said communication information into a location of said first information hold means specified by said instruction of the first kind for a write operation;
   means, responsive to execution by one of the subsystems of an instruction of the first kind for a read operation to said first information hold means, for reading out communication information from a location in said first information hold means specified by said instruction of the first kind for a read operation and for transferring said read out communication information to said one subsystem which has executed the instruction of the first kind for a read operation;
   means, responsive to execution by one of the subsystems of an instruction of the second kind for a write operation to said second information hold means, for transferring discriminating information specified by said instruction of the second kind for a write operation to said second information hold means from said one subsystem which has executed the instruction of the second kind for a write operation, for combining said transferred discriminating information with discriminating information already held in said second information hold means to generate single discriminating information, and for writing said single discriminating information in said second information hold means;
   means, responsive to execution by one of the subsystems of an instruction of the second kind for a read operation to said second information hold means, for reading out discriminating information held in said second information hold means and transferring the read out discriminating information to the one subsystem which has executed the instruction of the second kind for a read operation; and
   means, responsive to the discriminating information read out from said second information hold means, for erasing a portion of said held discriminating information related to said one subsystem which has executed said instruction of the second kind for a read operation.

41. A multiprocessor system according to claim 40, further comprising means responsive to said single discriminating information, for informing a subsystem specified by said transferred discriminating information of the existence of said transferred discriminating information.

42. A multiprocessor system according to claim 35, wherein discriminating information transferred in relation to certain communication information from one of said subsystems to said second information hold means comprises information indicating which one of the operating systems or which one of the programs controlled by one of the operating systems is to receive said communication information, and wherein said informing means comprises means for informing the one operating system of the existence of said new discriminating information when said new discriminating information indicates the one operating system or the one program controlled by the one operating system.

43. A multiprocessor system according to claim 34, wherein discriminating information transferred from a subsystem to said second information hold means and discriminating information held in said second information holding means each comprise a train of bits each allocated either to one of the operating systems of the subsystems or to one of a plurality of programs controlled by one of the operating systems.

44. A multiprocessor system according to claim 43, wherein said control means includes means, responsive to execution by one of the subsystems of an instruction of the second kind to read out discriminating information from said second information hold means, for erasing plural bits among said train of bits of said held discriminating information allocated either to an operating system of said one subsystem or to a plurality of programs controlled by the operating system of said one subsystem.

45. A multiprocessor system according to claim 43, wherein said control means comprises means for deriving a logical sum of discriminating information newly transferred from a subsystem to said second information hold means and discriminating information already held in said second information hold means to generate combined discriminating information and for storing the combined discriminating information in said second information hold means.

46. A multiprocessor system according to claim 45, wherein said multiprocessor system further comprises means responsive to the combined discriminating information, for informing a subsystem specified by said newly transferred discriminating information of the existence of said newly transferred discriminating information.

47. A multiprocessor system according to claim 34, wherein said first information hold means comprises a random access memory and said second information hold means comprises a register.

48. A multiprocessor system according to claim 47, wherein said register is separate from said random access memory.

49. A multiprocessor system according to claim 34, wherein said plurality of communication information comprises a message which has been transferred from one of a plurality of programs executed in a first subsystem under control of a first operating system and which is to be transferred to one of a plurality of programs executed in a second subsystem under control of a second operating system, and said plurality of communication information further comprises control information which has been transferred from said first operating system, which is to be transferred to said second operating system, and which is required for control of transfer of said message.

50. A multiprocessor system according to claim 34, wherein said plurality of communication information comprises a plurality of message which have been respectively transferred from some programs among a plurality of programs executed in a first subsystem under control of a first operating system and which are to be respectively transferred to some programs among a plurality of programs executed in a second subsystem under control of a second operating system.

* * * * *